Patented Mar. 2, 1954

2,671,035

UNITED STATES PATENT OFFICE 2,671,035

USE OF ION-EXCHANGE MATERIALS FOR REMOVAL OF SCALE DEPOSITS

William E. Bergman, Bartlesville, Okla., assignor to Phillips Petroleum Company, a corporation of Delaware No Drawing. Application November 16, 1948, Serial No. 60,383

5 Claims. (Cl. 134—7)

This invention relates to a process for removing scale deposits. In one of its more specific aspects, it relates to a process for the removal of inorganic or organic scale which may be deposited by water, oil, etc. in equipment such as pipes, tanks, and the like, by the use of slurries of ion exchange materials.

Many methods have been disclosed for removing scale deposits formed by the deposition of very slightly water soluble materials such as the sulfates and carbonates of calcium and magnesium, iron oxides, magnesium oxide or hydroxide (if water is alkaline), silicates, and the like. Some of these methods have merit whereas others are highly impractical. For example, it is uneconomical to remove scale and the like by mechanical means because in such apparatus as boilers and the like, the pipes have to be removed and cleaned and then reassembled. It is obvious that a great deal of time may be consumed in such cleaning operations and that it is possible to injure the equipment so cleaned. Other methods such as those using chemicals to dissolve scale are often highly unsatisfactory because of undue corrosion to metal parts.

It is an object of this invention to provide an improved process for the removal of scale deposits.

Another object is to provide a process for the removal of scale deposits caused by the mineral components in water.

Another object is to remove inorganic and organic scale deposits from difficultly accessible equipment.

Another object of this invention is to remove scale deposits avoiding corrosion and abrasion of the equipment from which the scale is removed.

Another object is to provide a simplified and economical method for the removal of scale deposits from boilers, tanks, and pipes by the use of ion exchange materials.

Another object is to provide a process for the removal of scale deposits from water handling equipment by use of cation or anion exchange material.

Further objects and advantages of my invention will be apparent to one skilled in the art by the accompanying disclosure and discussion.

I have discovered that boiler scale and scale in tanks, pipes and the like, particularly those deposited by water, may be removed by passing an aqueous slurry of an ion exchange material such as a zeolite through the equipment to be cleaned and in contact with the scale. Broadly my invention covers the removal of scale deposits by the use of both anion and cation exchange materials used in aqueous slurries. In some cases, it is realized that the process as herein described for treatment of deposits from water may also be applied analogously to systems in which the solvent is a fluid other than water. Such other fluids include alcohols and oils.

At first it might seem advisable to soften all the water passing through apparatus in which scale may deposit, but this is not the case. For one thing, not all of the materials in the water which may cause scale deposits are precipitated in the apparatus, and thus it requires thousands of gallons of water to cause appreciable scale. In many softening processes all of the scale forming materials are removed from the water or transformed to non-scale forming materials, thus requiring a greater economic outlay than is required to remove the scale deposits which comprise only a portion of all the scale forming materials in the water. Further some softening processes such as those using soda ash and the like do not completely prevent the formation of scale deposits and therefore scale must still be removed but at greater intervals.

Those materials which may be used according to my invention for the removal of scale deposits of the type such as calcium sulfate, calcium carbonate, iron oxide, magnesium sulfate, magnesium carbonate, tartrates, and the like are divided into two classes: cation exchange materials, and anion exchange materials. Among the cation exchangers are the zeolites such as natrolite, analcime, henlandite, chabazite, and thomsonite; carbonaceous materials such as sulfonated coals; and resins of the phenol-formaldehyde and tannin-formaldehyde types; and certain phenolic sulfonic acid derivatives. Anion exchangers, or as they are otherwise called, acid adsorbents, include inorganic materials such as hydroxy apatite, and heavy metal silicates; and organic materials such as amine-formaldehyde resins.

According to my invention, an ion exchange material or a mixture of such materials is circulated in a slurry such as an aqueous, alcoholic, or hydrocarbon slurry through equipment from which the scale is to be removed. This process may be carried out satisfactorily at room temperature or at slightly elevated temperatures usually not above about 212° F.

There are various possible ways by which the ion exchange material may remove scale, however my invention is not to be limited by any particular theory as to how the slurry of the ion exchange material removes the scale. One way in which the ion exchange material may be visualized as removing scale is that it ties up all the ions dissolved in water which are the same as either the positive or negative ion of the scale, depending on whether a cation or anion exchanger is used. By so doing there is always room, so to speak, in the water for more of the scale to dissolve. Just as soon as this happens, the ion exchange material reacts with the freshly dissolved ions from the scale thus binding up the particular ion by exchange. This action continues until all of the scale has dissolved in the water and reacted with the ion exchange material. Another possibility is that there is a direct ion exchange between the ion exchange material and the scale thus forming a substantially water soluble material which is then dissolved by the water of the slurry or by flushing with fresh water.

The particle size of the ion exchange material used in my invention to form the slurry may vary over a wide range. Broadly the particle size should be small enough so that it will flow with the water or other carrier liquid and not cause clogging of the equipment through which it is passed, and of a large enough size to be filterable. Generally a preferred range of particle size would be from 300 mesh up to ¼ to ½ inch, depending on the equipment to be treated. Such particles even of the larger sizes will have little or no scouring effect upon the scale other than to possibly remove scale already loosened by the ion exchange.

The following ionic equations illustrate two ways of practicing my invention; however, they are exemplary only and should not be considered as a limitation of the invention (1) $CaSO_4 + 2NaX \rightarrow CaX + 2Na^+ + SO_4^=$
(2) $CaSO_4 + 2YCl \rightarrow Y_2SO_4 + Ca^{++} + 2Cl^-$ where NaX represents an exchange material of the cationic type, and YCl represents an exchange material of the anionic type.

As may be seen by the above two equations, when a cation exchange material is used for removing scale the positive ion of the scale material is replaced by a positive ion, such as sodium, from the exchange material thus making a compound more soluble in water; and when an anion exchanger is used as shown in Equation 2, the anion of the exchanger, such as the chloride ion, replaces the anion of the scale and thereby also forming a more water soluble material.

Handling of the slurry of ion exchange material may be done in any one of several conventional ways. Usually a chamber of suitable size equipped with efficient stirring apparatus is utilized for making up the slurry. Water and ion exchange material, either fresh or regenerated, are introduced in such proportions that a slurry pumpable by such conventional pumps as centrifugal, diaphragm, or reciprocating is made. Some of the ion exchange materials such as the zeolites are preferably handled so that they remain moist. The reason for this is that when these materials dry out they lose a great deal of their surface area and porosity. To use such materials which have been dried necessitates first a treatment which will restore their surface area.

The design of the equipment from which the scale is to be removed will in a large measure limit the type of contacting used. For example, boiler tubes and the like are treated by circulating the slurry through them by suitable pumps as aforementioned. However, if a tank such as a storage tank is to be treated, the slurry is usually circulated by suitable stirring means.

Advantages of this invention are illustrated by the following examples. The reactants and their proportions, and other specific ingredients are presented as being typical and should not be construed to unduly limit the invention.

*Example I*

An aqueous slurry containing 0.5 gram of calcium sulfate in powdered form smaller than 200 mesh in 50 milliliters of water was passed through a column containing about 25 grams of a sodium zeolite. The calcium sulfate in the slurry acted as would a scale in a pipe through which is passed a slurry of an ion exchange material. The effluent from the column was found to be free of calcium as determined by the qualitative test using sodium oxalate. This shows that the ion exchange material, in this case a zeolite, efficiently removed the calcium from the slurry.

*Example II*

A sample of scale deposit from a pipe comprised primarily of calcium and magnesium sulfates and carbonates was placed in a suspension of a sodium zeolite. Approximately 10 weight per cent of the scale was dissolved by a 16 hour treatment at room temperature. A greater quantity of the scale would have been dissolved had agitation been used. However, this example shows what a minimum of scale removal might be under these conditions. Comparatively, if a zeolite slurry is continuously pumped through a pipe or agitated within a tank or boiler thus giving the greatest possible contact of fresh ion exchange material with the scale an amount in excess of 10 per cent of the scale is dissolved.

It is usually advantageous to regenerate the ion exchange material to hold the economic outlay to a minimum. This may be done in the case of a cation exchange material by any conventional process such as washing the exchanger with a salt brine which will react with the exchange material thereby replacing the positive ion thereof with the positive ion of the salt, in this instance sodium. Similarly an anion exchanger may be regenerated by contacting with an acid, such as hydrochloric acid, whose negative ion will replace the negative ion of the exchanger.

Regeneration of the ion exchange material may be carried out either continuously or intermittently. Often it is preferred to use the latter method. When so operating the ion exchange material to be regenerated is filtered from the slurry by any suitable means and placed in a tank or vessel to which is added the regeneration material. A typical method of regeneration is that of zeolite. The spent zeolite is placed in a suitable container and contacted with an aqueous solution of sodium chloride. The sodium of the salt replaces the calcium or other element of the spent exchange material thus reactivating same.

Although this process has been described and exemplified in terms of its preferred modifications, it is understood that various changes may be made without departing from the spirit and scope of the disclosure and of the claims.

I claim:

1. A process for the removal of inorganic scale deposits from equipment which comprises contacting an inorganic scale with an aqueous slurry of an ion exchange material and thereby instituting ion exchange between the components of said scale and said exchange material, removing the treated scale material in said slurry, separating the ion exchange material from said slurry and regenerating same, and recycling said regenerated ion exchange material in an aqueous slurry to the equipment from which said scale is being removed.

2. A process for the removal of water deposited scale from water handling equipment which comprises contacting a water deposited scale with an aqueous slurry of an anion exchange material and thereby instituting ion exchange between the anion of said scale and the anion of said exchange material; removing the treated scale in the water of said slurry, separating the anion exchange material from said slurry and regenerating same by contacting with an acid, and recycling said regenerated anion exchange material in an aqueous slurry to the equipment from which said scale is being removed.

3. A process for the removal of water deposited scale from water handling equipment which comprises contacting a water deposited scale with an aqueous slurry of a cation exchange material and thereby instituting ion exchange between the cation of said scale and the cation of said exchange material; removing the treated scale in the water of said slurry, separating the cation exchange material from said slurry and regenerating same by contacting with an acid, and recycling said regenerated cation exchange material in an aqueous slurry to the equipment from which said scale is being removed.

4. A process for the removal of water formed inorganic scale from water handling equipment which comprises circulating an ion exchange material in an aqueous slurry at a temperature in the range of room temperature to below 212° F. through equipment from which water formed scale is to be removed, removing the components of said scale from said equipment in the water of the slurry of said ion exchange material, separating the ion exchange material from said slurry and regenerating same, and recycling at least a portion of the regenerated ion exchange material in an aqueous slurry to the equipment from which said scale is being removed.

5. A process for the removal of calcium and magnesium sulfate scale from equipment which comprises circulating an aqueous slurry of an ion exchange material through equipment containing calcium and magnesium sulfate scale, contacting said scale with said ion exchange material at a temperature in the range of from room temperature to below 212° F., removing the components of said scale in said slurry, separating the ion exchange material from said slurry, regenerating said ion exchange material and recycling same to the equipment from which said scale is being removed.

WILLIAM E. BERGMAN.

References Cited in the file of this patent

UNITED STATES PATENTS

| Number | Name | Date |
|---|---|---|
| 1,049,054 | Coombs | Dec. 31, 1912 |
| 1,392,780 | Marsh | Oct. 4, 1921 |
| 1,965,339 | Hall | July 3, 1934 |
| 2,004,257 | Tschirner | June 11, 1935 |
| 2,294,765 | Urbain | Sept. 1, 1942 |
| 2,372,599 | Nachtman | Mar. 27, 1945 |
| 2,373,549 | D'Alelio | Apr. 10, 1945 |
| 2,382,262 | Scherer | Aug. 14, 1945 |
| 2,395,825 | Hesler | Mar. 5, 1946 |
| 2,556,128 | Webb | June 5, 1951 |